United States Patent [19]

Dale

[11] Patent Number: 4,721,319
[45] Date of Patent: Jan. 26, 1988

[54] REMOVABLE STEP COVER AND EXTENDER

[76] Inventor: Jerry D. Dale, 3701 Piute Tr., Austin, Tex. 78739

[21] Appl. No.: 916,947

[22] Filed: Oct. 8, 1986

[51] Int. Cl.$^4$ .............................................. B60R 3/02
[52] U.S. Cl. ...................................... 280/169; 182/92; 248/214
[58] Field of Search .................. 280/166, 169, 164 R, 280/163; 182/92; 248/210, 214

[56] References Cited

U.S. PATENT DOCUMENTS

| | | | |
|---|---|---|---|
| 1,735,948 | 11/1929 | Boca | 280/163 |
| 3,488,066 | 1/1970 | Hansen | 280/163 |
| 3,774,952 | 11/1973 | Zorn | 280/164 R |
| 4,185,849 | 1/1980 | Jaeger | 280/166 |
| 4,289,819 | 9/1981 | Kalman | 280/169 |
| 4,405,141 | 9/1983 | Jurek | 280/163 |
| 4,570,962 | 2/1986 | Chavira | 280/166 |
| 4,620,609 | 11/1986 | Elsten | 280/163 |

Primary Examiner—Richard A. Bertsch
Attorney, Agent, or Firm—Zarley, McKee, Thomte, Voorhees & Sease

[57] ABSTRACT

A door step surface area is enlarged on a motor home by use of a removable step cover which is larger in area than the step. The cover includes a downwardly extending flange along its rear edge which merges into a forwardly extending flange which extends under the downwardly extending flange along the rear of the step and limits upward and forward movement of the cover on the step. An L-shaped locking element is provided on the lower side of the step cover along the front and includes one leg adjustably connected to the step cover with the other leg extending downwardly and rearwardly into engagement with the lower edge of the downwardly extending flange on the front of the step. The downwardly extending flange is resiliently flexible allowing it to snap in and out of engagement with the front step flange for attachment and removal of the step cover.

8 Claims, 7 Drawing Figures

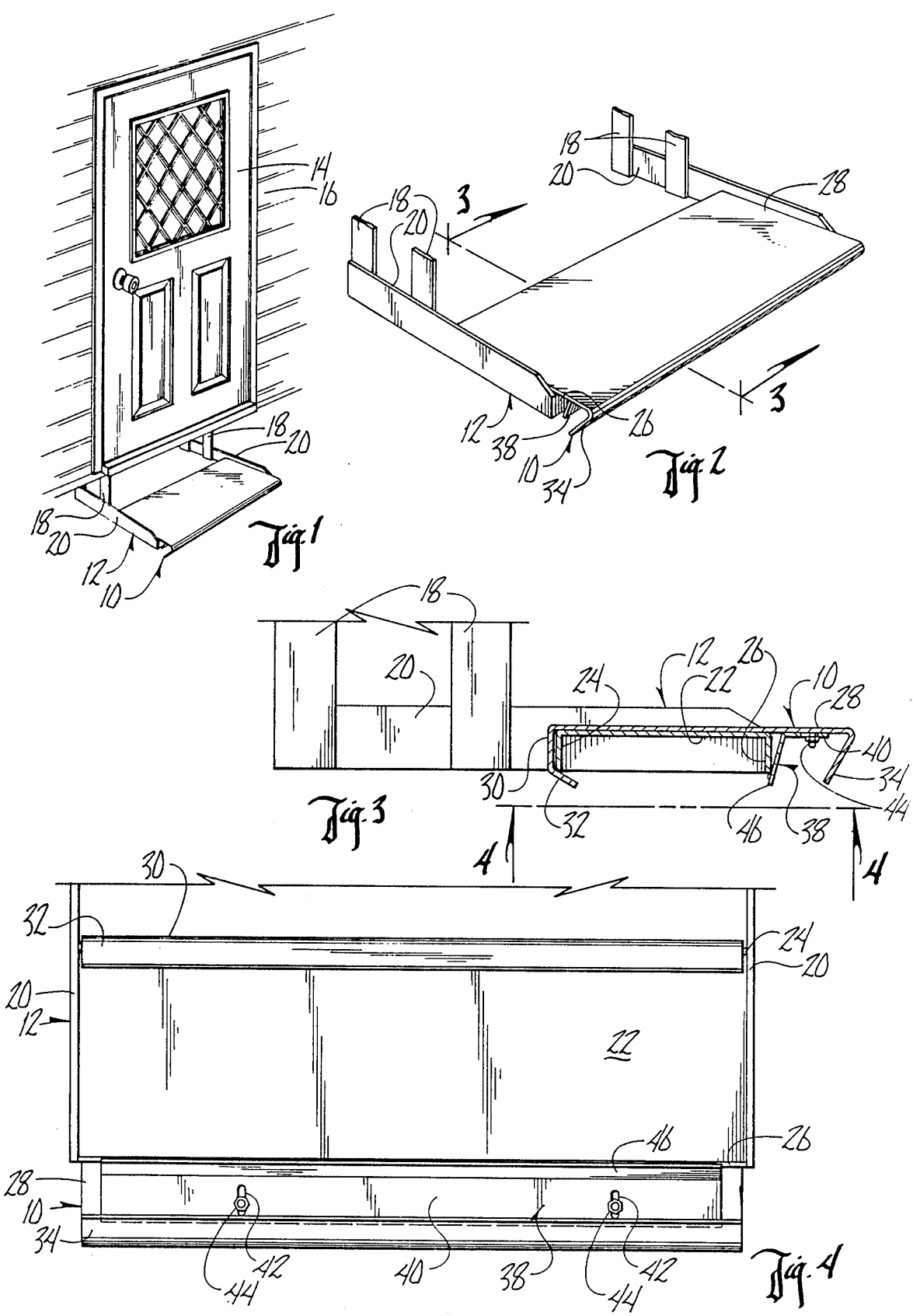

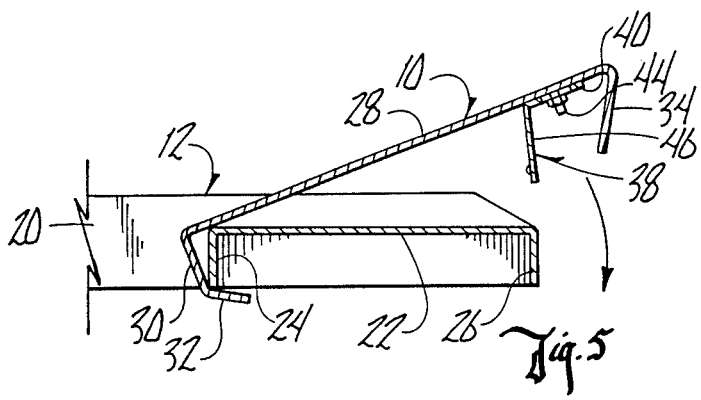
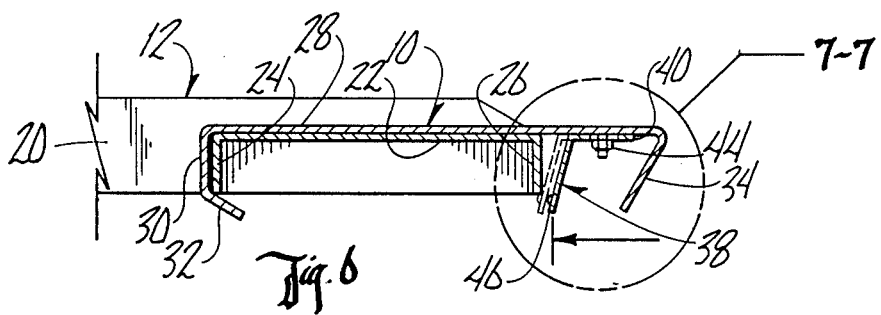
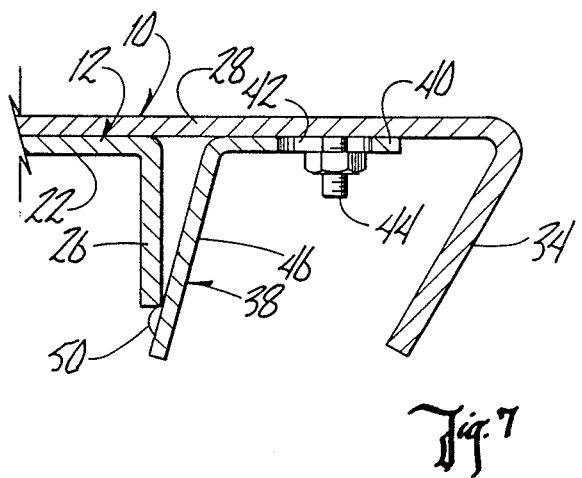

REMOVABLE STEP COVER AND EXTENDER

BACKGROUND OF THE INVENTION

Typical motor home steps in front of the entrance door or the cab doors are dangerously small making them unsafe to step on without risk of the foot slipping off and the person being seriously injured. A step cover is needed that will enlarge the area of the step surface but which may be quickly attached and removed as desired. The step should be foolproof in use and have a positive locking means for locking the step cover on the step.

SUMMARY OF THE INVENTION

The step cover of this invention extends the typical step another two inches in depth away from the door. A typical step is eight inches in depth and the step cover of this invention will extend it to approximately ten inches. The step cover of this invention may be made to any desired dimensions to fit varying step sizes.

The step cover of this invention includes a downwardly extending flange along its rear edge which has a forwardly extending flange for hooking around the downwardly extending rear flange on the step. This engagement is made first by angling the step cover upwardly over the step until the pair of flanges are hooked under and around the rear flange on the step. The step cover is then moved downwardly flat against the top of the step and an L-shaped lock element on the bottom side of the step cover is then moved into engagement with the downwardly extending front flange on the step. One leg of the locking element includes a slot which allows it to be adjustably connected to the step cover so that it may be fitted to any step size while the second leg extends downwardly and rearwardly and engages the bottom edge of the downwardly extending front step flange. A detent element is provided for snapping into engagement with the lower edge of the front step flange. Attachment and removal of the step cover is now easily accomplished by simply lifting up the step cover to remove it whereby the detent snaps out of engagement with the flange during removal and snaps into engagement when the step cover is being pushed down into the use position.

BRIEF DESCRIPTION OF THE DRAWINGS

FIG. 1 is a fragmentary perspective view of the side of the motor home showing the step cover of this invention mounted on the step at the entrance door.

FIG. 2 is an enlarged fragmentary perspective view of the step cover installed on a step.

FIG. 3 is a cross-sectional view taken along line 3—3 in FIG. 2.

FIG. 4 is a bottom plan view thereof taken along line 4—4 in FIG. 3.

FIG. 5 is an end elevational view showing the first step of mounting the step cover onto the step wherein the rear side of the step cover engages the rear flange of the step.

FIG. 6 is an end elevational view showing the step cover mounted on the step.

FIG. 7 is an enlarged fragmentary end elevational view of the step cover mounted on the step showing the locking detent engaging the lower edge of the step front flange.

DESCRIPTION OF THE PREFERRED EMBODIMENT

The removal step cover of this invention is referred to generally in FIG. 1 by the reference numeral 10 and is shown mounted on a step 12 in front of an entrance door 14 on a motor home 16.

The step 12 includes a pair of oppositely disposed downwardly extending mounting brackets 18 which are connected to oppositely disposed horizontally extending end plates 20 on a step plate 22. As seen in FIG. 3, step 22 includes a downwardly extending flange 24 along the rear edge and a downwardly extending flange 26 along the front edge of the step plate 22.

The step cover extender 10 includes a top plate 28 having a downwardly extending flange 30 along its rear edge which merges into a forwardly downwardly extending flange 32, as seen in FIG. 3. The flange 30 extends along the step flange 24 while the flange 32 extends forwardly under the lower edge of the step flange 24 thereby limiting forward and upward movement of the step cover relative to the step. The cover plate 28 includes along its forward side a downwardly and rearwardly extending flange 34 which eliminates any sharp edges along the front side of the step cover.

The step cover may be easily attached and removed from the step through use of an L-shaped locking element 38 which includes a horizontally extending leg 40 positioned along the bottom side of the step cover. The leg 40 includes an elongated slot 42 through which an adjustment bolt 44 on the cover plate extends. A downwardly and rearwardly extending leg 46 engages the lower edge of the front step flange 26. The leg 46 is resiliently flexible so that it may snap into and out of engagement with the step flange 26. In FIG. 7 a detent 50 is seen engaging the lower edge of the front step flange 26.

Thus it is seen in operation that the step cover may be positioned on the step by first positioning the step cover as seen in FIG. 5 with the front end raised up and the rear side positioned to hook around the rear downwardly extending step flange 24. Next the front end of the step cover is moved downwardly to the position of FIG. 6 such that the L-shaped lock element 38 is in a position to be moved rearwardly against the front step flange 26 and the lock bolt 44 is tightened down to hold the lock element in position. Thereafter, if it is desired to move the step cover, it is only necessary to lift up along the forward edge and the leg 46 will resiliently flex forward as the detent 50 moves past the bottom edge of the front step flange 26, as seen in FIG. 7. Thereafter when the step cover is repositioned on the step the detent 50 will simply snap into the position of FIG. 7 as the leg 46 yieldably flexes forward.

Thus it is seen that the step cover 10 may be attached and removed as desired or left permanently on the step 12. The step cover may be made any size to fit any size step.

What is claimed is:

1. A vehicle step and removable step cover and extender comprising,
   a vehicle step having a top flat side and front and rear downwardly extending flanges,
   a cover plate matingly engaging said top flat side of said vehicle step and having an extension portion which extends beyond said front flange, and front and rear sides and a downwardly extending flange along said rear side engaging said downwardly extending flange on the rear of said vehicle step to limit forward movement of said cover plate, a lock means positioned on the bottom side of said extension portion of said cover plate including a lock element extending downwardly and rearwardly into locking engagement with said downwardly extending front flange of said vehicle step.

2. The structure of claim 1 wherein said lock element is resiliently flexible and yieldably engages the lower edge of said downwardly extending front flange of said vehicle step.

3. The structure of claim 2 wherein a detent element is provided on the lower end of said lock element and engages the bottom edge of the front flange of said vehicle step.

4. The step cover of claim 1 wherein said downwardly extending flange along the rear of the cover plate merges into a forwardly extending flange for extending under a downwardly extending flange on the rear of a step to limit upward movement of said cover plate.

5. The step cover of claim 1 wherein said lock element is further defined as a flange.

6. The step cover of claim 5 wherein said flange element is one leg of two legs of said lock means, said second leg extends horizontally forwardly along the bottom side of said cover plate and is secured thereto by an adjustable bolt means connected to said cover plate.

7. The step cover of claim 6 wherein said second leg includes a slot in which said bolt means is received to allow for selectively positioning said first leg against the front flange of said step.

8. The cover step of claim 7 wherein a detent element is provided on the lower end of said first leg of said lock means for releasable engagement with the bottom edge of the front flange of said step.

* * * * *